United States Patent
Grover et al.

(10) Patent No.: US 10,009,427 B2
(45) Date of Patent: *Jun. 26, 2018

(54) TWO-STAGE EVENT-DRIVEN MOBILE DEVICE TRACKING FOR VEHICLES

(71) Applicant: LIVIO, INC., Royal Oak, MI (US)

(72) Inventors: Joey Ray Grover, Madison Heights, MI (US); Justin Dickow, Royal Oak, MI (US); Scott Smereka, Warren, MI (US); Corey Maylone, Berkley, MI (US)

(73) Assignee: Livio, Inc., Royal Oak, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/398,249

(22) Filed: Jan. 4, 2017

(65) Prior Publication Data

US 2017/0195423 A1 Jul. 6, 2017

Related U.S. Application Data

(60) Provisional application No. 62/275,055, filed on Jan. 5, 2016.

(51) Int. Cl.
*H04M 1/00* (2006.01)
*H04L 29/08* (2006.01)
*H04W 4/00* (2018.01)
*H04W 4/02* (2018.01)
*H04W 4/80* (2018.01)

(52) U.S. Cl.
CPC ............. *H04L 67/12* (2013.01); *H04W 4/008* (2013.01); *H04W 4/023* (2013.01); *H04W 4/80* (2018.02)

(58) Field of Classification Search
CPC ..... H04W 8/245; H04W 64/00; H04W 4/008; H04W 4/023; B06R 25/1001; H04L 67/12
USPC ............... 455/456.6, 418, 556.1; 340/426.24
See application file for complete search history.

(56) References Cited

U.S. PATENT DOCUMENTS

| | | |
|---|---|---|
| 8,145,199 B2 | 3/2012 | Tadayon et al. |
| 8,401,578 B2 | 3/2013 | Inselberg |
| 9,467,817 B1 * | 10/2016 | Van Wiemeersch .. H04W 4/046 |
| 2012/0194356 A1 * | 8/2012 | Haines ................... G08G 1/161 340/933 |
| 2012/0197488 A1 * | 8/2012 | Lee ..................... H04L 63/0861 701/36 |
| 2014/0218189 A1 * | 8/2014 | Fleming ................. G08B 21/24 340/457 |
| 2014/0274020 A1 | 9/2014 | Miller |
| 2014/0335902 A1 | 11/2014 | Guba et al. |
| 2015/0148989 A1 | 5/2015 | Cooper et al. |
| 2016/0142877 A1 * | 5/2016 | Gujral ................... H04W 4/046 455/456.1 |
| 2016/0337815 A1 * | 11/2016 | Cuddihy ............... H04W 4/046 |

(Continued)

*Primary Examiner* — Danh Le
(74) *Attorney, Agent, or Firm* — Jennifer M. Stec; Brooks Kushman P.C.

(57) ABSTRACT

A vehicle may include wireless signal sensors surrounding the doors of the vehicle. A processor of the vehicle may be programmed to capture, from the sensors, a first data snapshot when one of the doors is opened and a second data snapshot when the one of the door is closed, and assign a mobile device to a seating zone associated with the one of the doors when the first and second snapshots both indicate the mobile device is closest to the door.

19 Claims, 4 Drawing Sheets

(56) References Cited

U.S. PATENT DOCUMENTS

2017/0134661 A1\* 5/2017 Chietein ............ H04N 5/23293
2017/0161902 A1\* 6/2017 Patil ...................... G06T 7/0044

\* cited by examiner

TWO-STAGE EVENT-DRIVEN MOBILE DEVICE TRACKING FOR VEHICLES

CROSS-REFERENCE TO RELATED APPLICATIONS

This application claims the benefit of U.S. provisional application Ser. No. 62/275,055 filed Jan. 5, 2016, the disclosure of which is hereby incorporated in its entirety by reference herein.

TECHNICAL FIELD

Aspects of the disclosure generally relate to a two-stage event-driven approach for tracking a mobile device entering or exiting a vehicle.

BACKGROUND

Sales of personal devices, such as smartphones and wearables, continue to increase. Thus, more personal devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of personal devices into the driving experience.

SUMMARY

In a first illustrative embodiment, a wireless signal sensors surrounding vehicle doors; and a processor programmed to capture, from the sensors, a first data snapshot when one of the doors is opened and a second data snapshot when the one of the door is closed, and assign a mobile device to a seating zone associated with the one of the doors when the first and second snapshots both indicate the mobile device is closest to the door.

In a second illustrative embodiment, a method includes capturing, from wireless signal sensors surrounding vehicle doors, a first data snapshot when one of the doors is opened and a second data snapshot when the door is closed; assigning a mobile device to a seating zone associated with the door when the first and second snapshots both indicate the mobile device is closest to the door; and applying settings associated with the mobile device to the seating zone.

In a third illustrative embodiment, a non-transitory computer-readable medium embodying instructions that, when executed by a processor of a vehicle in communication with wireless signal sensors surrounding doors of the vehicle, cause the vehicle to capture, from the sensors, a first data snapshot responsive to receipt of an indication from a body controller that one of the doors is opened; capture, from the sensors, a second data snapshot responsive to receipt of an indication from the body controller that the one of the doors is closed; assign a mobile device to a seating zone associated with the door when the first and second snapshots both indicate the mobile device is closest to the door; and apply settings associated with the mobile device to the seating zone.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Certain tasks within a vehicle environment may require knowledge about where a user sits in the vehicle. For example, a user may have an application installed on his or her mobile device to automatically apply climate control presets where the user is located. However, the vehicle may be required to identify the seating zone of the user in order to apply the settings.

The vehicle may include sensors which can communicate with mobile devices to provide distance or signal strength measurement information between the mobile devices and the sensors. In an example, the sensors may be Bluetooth low energy (BLE) sensors. As a more specific example, the sensors in the vehicle may advertise as BLE peripherals and an application residing on the mobile device may scan for BLE peripherals as a BLE central. A vehicle processor may use data from the sensors to perform an instantaneous triangulation of the mobile device to identify the device location. However, a mobile device might be located in a portion of the vehicle that is used for storage. For example, multiple users may place their devices in a center console. In such a situation, it may be unclear to the processor in which seat the owner of the mobile device is sitting.

An improved system for the identification of ownership of mobile devices may include identification of a mobile device of a user based on triggered events. These events may include an action of the user opening a vehicle door, and an action of the user closing the vehicle door. When the user opens one of the doors, e.g. the driver door, the vehicle requests signal strength and attributes information from the sensors. The vehicle compile a first data snapshot of the distances and identifiers of the mobile devices in communication with the sensors. The vehicle may utilize the first snapshot data to identify which mobile device is closest to the door being opened. When the door is later closed, the vehicle may take a second data snapshot. If the closest mobile device to the door at closure continues to be the mobile device closest to the door when opened, the vehicle may associate that mobile device with the seating position of the door that was opened and closed. When the vehicle is shut off, the vehicle may also monitor for the door to be reopened, and, may perform a reverse process to confirm that the mobile device has left the vehicle.

Figure 1:
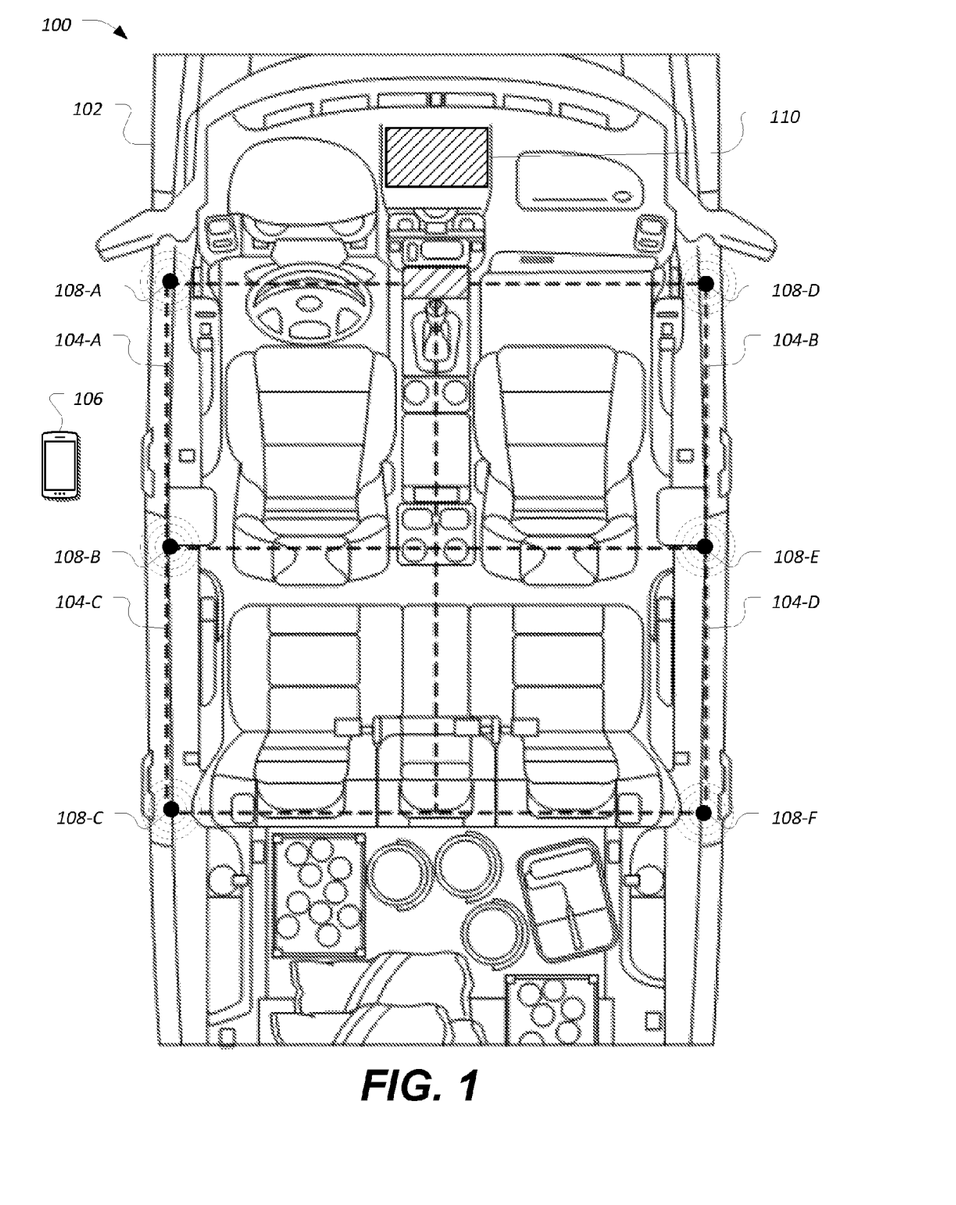
FIG. 1 illustrates an example system including a vehicle having an array of wireless sensors for use in assigning mobile devices to seating zones.

FIG. 1 illustrates an example system 100 including a vehicle 102 having an array of wireless sensors 108-A through 108-F (collectively 108) for use in assigning mobile devices 106 to seating zones 104-A through 104-D (collectively 104). The assignment of mobile devices 106 to seating zones 104 may be performed by the vehicle computing system 110 based on data about the mobile devices 106 received from the wireless sensors 108. The assignment of mobile devices 106 to seating zones 104 may be used, in an example, to determine which mobile devices 106 is the driver device. It should be noted that the illustrated system 100 is merely an example, and more, fewer, and/or differently located elements may be used. For examples, different vehicles 102 may include more, fewer, or differently-arranged seating zones 104 and/or wireless sensors 108.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, seating, doors, towing ability and capacity, and storage volume.

The vehicle 102 interior may be divided into multiple zones 104, where each seating zone 104 may be associated with a seating position within the vehicle 102 interior. For instance, the front row of the illustrated vehicle 102 may include a first zone 104-A associated with the driver seating position, and a second zone 104-B associated with a front passenger seating position. The second row of the illustrated vehicle 102 may include a third zone 104-C associated with a driver-side rear seating position and a fourth zone 104-D associated with a passenger-side rear seating position.

The mobile devices 106 may be any of various types of portable computing device, such as cellular phones, tablet computers, smart watches, laptop computers, portable music players, or other devices capable of networked communication. The mobile devices 106 may provide network connectivity to a communications network via a device modem of the mobile devices 106. The communications network may provide communications services, such as packet-switched network services (e.g., Internet access, VoIP communication services), to devices connected to the communications network. An example of a communications network may include a cellular telephone network. To facilitate the communications over the communications network, mobile devices 106 may be associated with unique device identifiers (e.g., mobile device numbers (MDNs), Internet protocol (IP) addresses, BLUETOOTH identifications, etc.) to identify the communications of the mobile devices 106 over the communications network.

The wireless sensors 108 may include various types of wireless transceivers configured to communicate wirelessly with the mobile devices 106. In an example, the wireless sensors 108 may include one or more of a BLUETOOTH module, a ZIGBEE transceiver, a Wi-Fi transceiver, an IrDA transceiver, an RFID transceiver, etc.) configured to communicate with compatible wireless transceivers of the mobile devices 106.

The wireless sensors 108 in the vehicle 102 may support BLE or another wireless technology that can provide distance or signal measurements to mobile devices 106 in relation to wireless communications between the mobile devices 106 and the wireless sensor 108. As a more specific example, the mobile devices 106 may communicate with wireless sensors 108 supporting BLE to capture received signal strength indication (RSSI) information provided by BLE protocol. In such a BLE example, the wireless sensors 108 of the vehicle 102 may advertise as BLE Peripherals, and an application executed by the mobile device 106 may scan for BLE Peripherals as a BLE Central.

The wireless sensors 108 may be configured to provide signal strength information to indicate a stronger signal as the mobile device 106 approaches the wireless sensor 108, and a weaker signal as the mobile device 106 departs from the wireless sensor 108. As another possibility, the wireless sensors 108 may be configured to provide distance information indicating a measure of the distance between the wireless sensor 108 and the mobile devices 106 that becomes smaller as the mobile devices 106 approaches the wireless sensor 108, and that becomes greater as the mobile device 106 departs from the wireless sensor 108.

The wireless sensors 108 may be arranged to surround the entrances and exits to the different seating zones 104 of the vehicle 102. In the illustrated example, the wireless sensors 108-A and 108-B surround the entrance to the seating zone 104-A, the wireless sensors 108-B and 108-C surround the entrance to the seating zone 104-C, the wireless sensors 108-D and 108-E surround the entrance to the seating zone 104-B, and the wireless sensors 108-E and 108-F surround the entrance to the seating zone 104-D. In many cases, the wireless sensors 108 may be located in the vehicle in the pillars between the entrances or doors. Continuing with the illustrated example, the wireless sensor 108-A may be located in the driver-side A-pillar, the wireless sensor 108-B may be located in the driver-side B-pillar, the wireless sensor 108-C may be located in the driver-side C-pillar, the wireless sensor 108-D may be located in the passenger-side A-pillar, the wireless sensor 108-E may be located in the passenger-side B-pillar, and the wireless sensor 108-F may be located in the passenger-side C-pillar.

Variations on the number and arrangement of zones 104 are possible. For instance, an alternate second row may include an additional fifth zone 104-E of a second-row middle seating position (not shown). Or, a vehicle 102 having a third row may have an additional fifth zone 104-E behind the third zone 104-C and an additional sixth zone 104-F behind the fourth zone 104-D (not shown). It should be noted that differences in the zones 104 may affect the arrangement of wireless sensors 108. For instance, a vehicle 102 having additional rows of doors may require additional wireless sensors 108 to surround the doors. In general, each side of the vehicle 102 may include (n+1) wireless sensors 108, where n is the number of doors. Assuming the number n of doors is even, the vehicle 102 may include (n+2) wireless sensors 108 in total. For example, a vehicle 102 having four doors will include six sensors placed in a grid pattern in the vehicle 102, having two columns and three rows.

The vehicle computing system 110 may be configured to provide telematics services to the vehicle 102. These services may include, as some non-limiting possibilities, navigation, turn-by-turn directions, vehicle health reports, local business search, accident reporting, and hands-free calling. In an example, the vehicle computing system 110 may include the SYNC system manufactured by The Ford Motor Company of Dearborn, Mich.

The vehicle computing system 110 may be further configured to communicate with other components of the vehicle 102 via one or more in-vehicle networks. The in-vehicle networks may include one or more of a vehicle controller area network (CAN), an Ethernet network, and a media oriented system transfer (MOST), as some examples. The in-vehicle networks may allow the vehicle computing system 110 to communicate with other vehicle systems, such as a vehicle modem (which may not be present in some configurations), a global positioning system (GPS) module configured to provide current vehicle location and heading information, and various other vehicle controllers. In an example, the vehicle computing system 110 may be configured to communicate with a body controller of the vehicle 102 to receive events such as indications that a vehicle 102 door was opened, and indications that a vehicle 102 door was closed.

The vehicle computing system 110 may receive input from human-machine interface (HMI) controls 114 configured to provide for occupant interaction with the vehicle 102. For instance, the vehicle computing system 110 may interface with one or more buttons or other HMI controls configured to invoke functions on the vehicle computing system 110 (e.g., steering wheel audio buttons, a push-to-talk button, instrument panel controls, etc.). The vehicle computing system 110 may also drive or otherwise communicate with one or more displays configured to provide visual output to vehicle occupants. In some cases, the display may be a touch screen further configured to receive user touch input (e.g., operating as an HMI control), while in other cases the display may be an output device only, without also having input capabilities.

The vehicle computing system 110 may interface with a wireless transceiver configured to communicate with the mobile devices 106 of the vehicle occupants. In an example, when connected to a mobile device 106, the vehicle computing system 110 may utilize the network connectivity of the mobile devices 106 to provide the vehicle computing system 110 with connectivity to the communications network. In an example, the vehicle computing system 110 may connect to one of the mobile devices 106 indicated as being in the driver seating zone 104-A as the driver device, and may use the driver device to access the communications network.

In some examples, the wireless transceiver of the vehicle computing system 110 may allow the vehicle computing system 110 to communicate with the wireless sensors 108. For instance, the vehicle computing system 110 may communicate with the wireless sensors 108 to receive the signal strength information between the wireless sensors 108 and the mobile devices 106. As another possibility, the vehicle computing system 110 may communicate with the wireless sensors 108 over wired connections. For instance, the vehicle computing system 110 may communicate with the wireless sensors 108 over wired universal serial bus (USB) connections connecting the vehicle computing system 110 to the wireless sensors 108.

The wireless sensors 108 may be used by the mobile devices 106 and/or the vehicle computing system 110 to attempt an instantaneous triangulation of the mobile device 106 within the vehicle 102. However, the mobile device 106 might be located in a zone 104 of the vehicle 102 that is used for storage, such as the center console to which multiple persons within the vehicle 102 might have access to place their mobile devices 106. This situation may cause ambiguous results, as the wireless sensors 108 may be unable to provide data from which the vehicle computing system 110 may reliably determine seating zone 104 ownership of the mobile device 106.

An improved system for the identification of ownership of mobile devices 106 may be event-driven based on the actions of opening and closing a door of the vehicle 102. When the user opens one of the doors, e.g. the driver door, the vehicle computing system 110 may utilize the wireless sensors 108 to capture signal strength and attribute information (e.g., unique identifiers) for mobile devices 106 in vicinity of the vehicle 102. When the door is closed, the vehicle computing system 110 may again capture the signal strength and attribute information. If the closest mobile device 106 to the door at closure continues to match the preassigned mobile device 106 closest to the door when opened, the vehicle computing system 110 may associate that mobile device 106 with a seating position zone 104 of the vehicle 102 associated with the door.

Figure 2A:
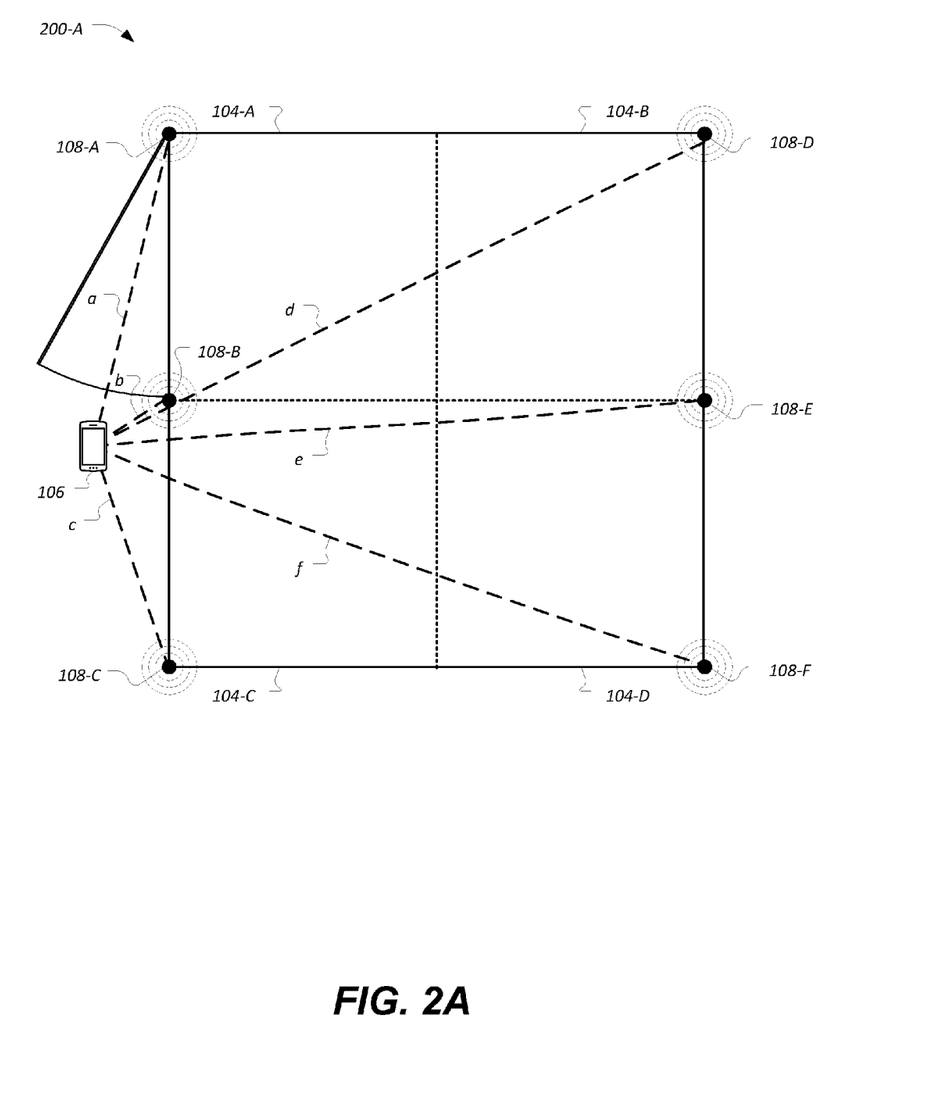
FIG. 2A-2B illustrate an example diagram of movement of a mobile device into the driver seating zone of the vehicle.

FIG. 2A illustrates an example 200-A including the mobile device 106 before the mobile device 106 has begun to enter the vehicle 102 through the open door. In the illustrated examples 200-A, the vehicle 102 includes four seating zones 104-A through 104-D. The example 200-A also includes six wireless sensors 108-A through 108-F surrounding doors to the four seating zones 104-A through 104-D.

The distance between each wireless sensor 108 and the mobile device 106 may be tracked by the vehicle computing system 110. As shown, the distance between the wireless sensor 108-A and the mobile device 106 is indicated as the distance a, the distance between the wireless sensor 108-B and the mobile device 106 is indicated as the distance b, the distance between the wireless sensor 108-C and the mobile device 106 is indicated as the distance c, the distance between the wireless sensor 108-D and the mobile device 106 is indicated as the distance d, the distance between the wireless sensor 108-E and the mobile device 106 is indicated as the distance e, and the distance between the wireless sensor 108-F and the mobile device 106 is indicated as the distance f. It should be noted that many examples herein reference the values a, b, c, d, e, and f in terms of distance, in which lower values indicate closer proximity. In other examples however, the values a, b, c, d, e, and f may be signal strength values in which higher values indicate closer proximity. In examples in which the values a, b, c, d, e, and f relate to signal strength, the analysis in terms of increasing and decreasing values may be reversed.

Figure 2B:
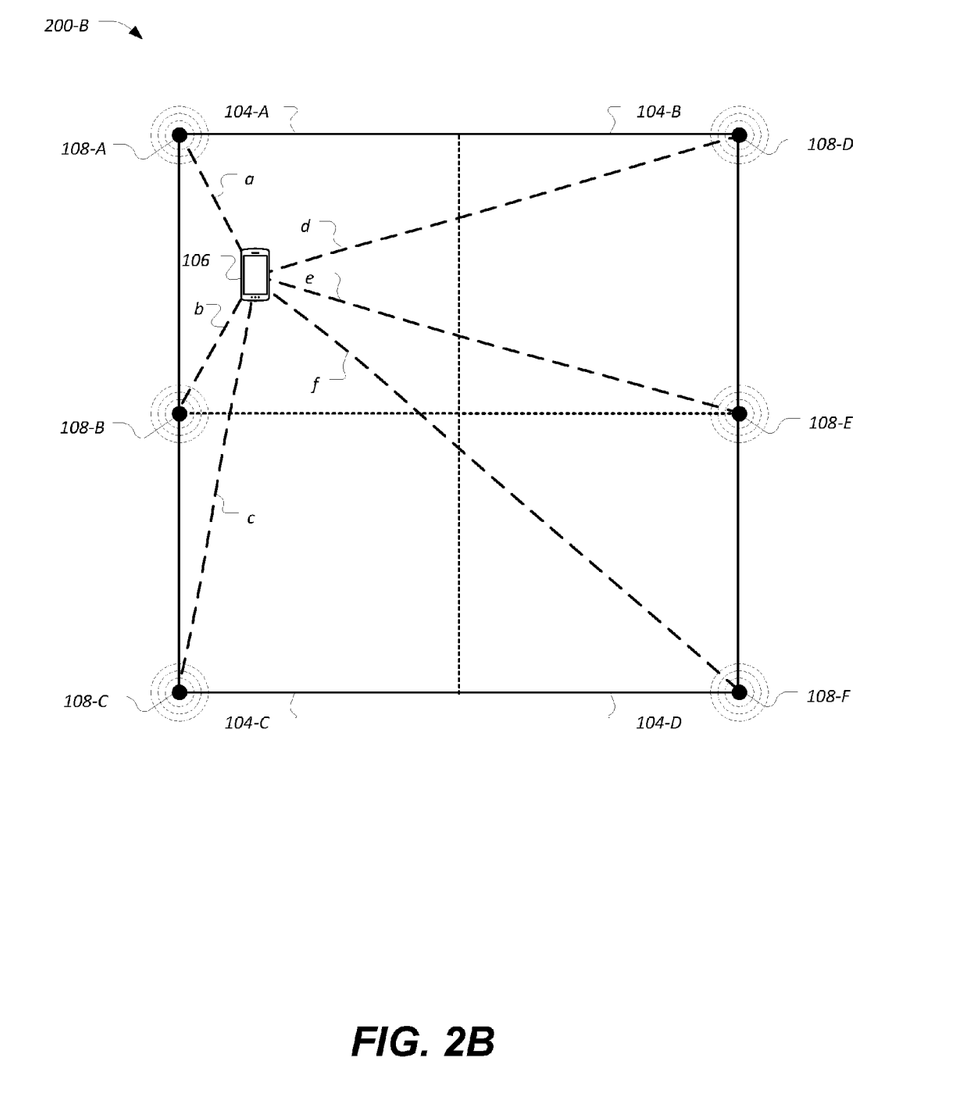

In the illustrated examples 200, the vehicle 102 includes four seating zones 104-A through 104-D. The example 200 also includes six wireless sensors 108-A through 108-F surrounding doors to the four seating zones 104-A through 104-D. The wireless sensors 108 in the example 200 may be aligned in the pillars of the vehicle 102 to provide data representative of path taken by a person who passes to enter one of the zones 104 of the vehicle 102 through a respective vehicle 102 door. Thus, there are four pairs of wireless sensors 108 that represent each door: (108-A, 108-B) for the driver door, (108-B, 108-C) for the driver-side rear door, (108-D, 108-E) for the front passenger door, and (108-E, 108-F) for the passenger-side rear door. The ordering of the wireless sensors 108 may be stored by the vehicle computing system 110, or in other examples may be received or understood by the vehicle computing system 110 from information broadcast or otherwise provided by the wireless sensors 108. As one possibility, each of the wireless sensors 108 may broadcast information indicative of its row and column to the vehicle computing system 110.

The vehicle computing system 110 may collect values from the wireless sensors 108 along with attributes of the mobile device 106. In an example, the vehicle computing system 110 may wirelessly send a query message to the sensors 108, and the sensors may reply to the message 108 including the signal strength, distance, identifiers of the mobile devices 106, or other attributes information regarding the mobile devices 106. In another example, vehicle computing system 110 may query the sensors 108 by wired connection, such as via USB connections between the sensors 108 and the vehicle computing system 110.

The collection of the tracked values and mobile device 106 attributes may be referred to as a data snapshot 202. The data snapshot 202 may be collected by the vehicle computing system 110 responsive to various events, such as the opening of the vehicle door or the closing of the vehicle door. In some cases, there may be one mobile device 106 in communication with the wireless sensors 108, and the data snapshot 202 may include tracked values and mobile device 106 attributes for the one mobile device 106. In other cases, there may be multiple mobile devices 106 in communication with the wireless sensors 108, and the data snapshot 202 may include tracked values and mobile device 106 attributes for each of the tracked mobile device 106.

Referring more specifically to the example 200-A, the vehicle computing system 110 collects a data snapshot 202-A responsive to the opening of the vehicle door. Using the data snapshot 202, the vehicle computing system 110 determines which of the mobile devices 106 is closest in location to the opened door. The vehicle computing system 110 may associate the unique identifier of the mobile device 106 closest to the door with an indication that the mobile device 106 is a candidate for being located within the zone 104 of the vehicle 102 accessible from the opened door.

In an example, the vehicle computing system 110 may use the values a, b, c, d, e, and f to compute the values corresponding to each of the doors to the seating zones 104 of the vehicle 102. These values corresponding to each of the doors to the seating zones 104 may be referred to as monitor pair values. Each monitor pair value may be based on distance values for the wireless sensors 108 located on either side of the door. For instance, for the seating zone 104-A the mobile device 106 may compute the monitor pair value a+b, for the seating zone 104-C the mobile device 106 may compute the monitor pair value b+c, for the seating zone 104-B the mobile device 106 may compute the monitor pair value d+e, and for the seating zone 104-D the mobile device 106 may compute the monitor pair value e+f These values may be computing using the data snapshot 202 to identify which mobile devices 106 are closest to which seating zones 104. For instance, in the case of opening thee driver door, the mobile device 106 with the highest signal strength or shortest distance to the monitor pair value a+b may be considered to be the closest mobile device 106 to that door.

FIG. 2B illustrates an example 200-B including the mobile device 106 having entered the vehicle 102 and with the door being closed. In the example 200-B, the vehicle computing system 110 collects a second data snapshot 202 responsive to the closing of the vehicle door. Using the second data snapshot 202, the vehicle computing system 110 may again determine which of the mobile devices 106 is closest in location to the opened door. If the closest mobile device 106 to the door at closure continues to match the mobile device 106 deemed to be closest to the door when opened, the vehicle computing system 110 may associate that mobile device 106 with the seating zone 104 of the door that was opened and closed (e.g., in this example the driver seating zone 104-A).

The vehicle 102 may continue to monitor for events including the door being reopened and closed. For instance, the vehicle computing system 110 may similarly collect data snapshots 202 when a door is opened and data snapshots 202 with the door is closed to determine whether additional mobile devices 106 have entered the vehicle 102.

Additionally, the vehicle computing system 110 may similarly collect data snapshots 202 to determine whether mobile devices 106 have exited the vehicle 102. In an example, for mobile devices 106 that are previously associated with seating zones 104, the vehicle computing system 110 may, responsive to an event of the door being opened, collect a data snapshot 202 in which the mobile device 106 associated with the zone 104 is identified as being closest to the zone 104. Responsive to the event of the door being closed, the vehicle computing system 110 may collect a data snapshot 202 in which the mobile device 106 associated with the zone 104 is no longer located in the zone 104. Based on the determination, the vehicle computing system 110 may remove the association of the mobile device 106 with the seating zone 104.

Figure 3:
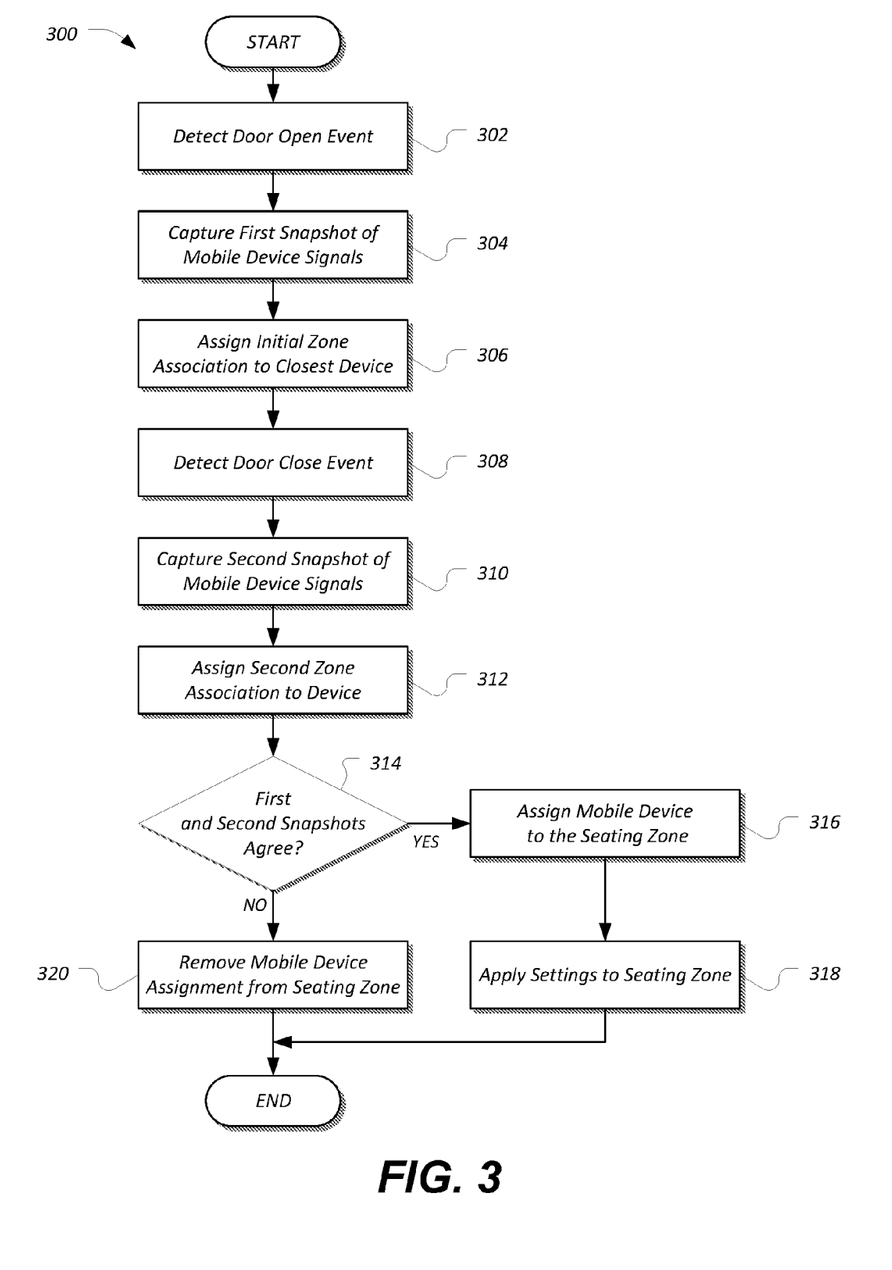
FIG. 3 illustrates an example process for determining seating zones for mobile devices.

FIG. 3 illustrates an example process 300 for determining seating zones 104 for mobile devices 106. In an example, the process 300 may be performed by the vehicle computing system 110 in communication with wireless sensors 108 of the vehicle 102.

At operation 302, the vehicle computing system 110 detects a door open event. In an example, the vehicle computing system 110 may receive an indication from the body controller that a door of the vehicle 102 has been opened.

At 304, the vehicle computing system 110 captures a first data snapshot 202. In an example, the vehicle computing system 110 may request tracked values and mobile device 106 attributes from the wireless sensors 108. The vehicle computing system 110 may receive the information, and compile the information into a first data snapshot 202.

At operation 306, the vehicle computing system 110 assigns an initial zone 104 association to the mobile device 106 closest to the opened door. In an example, the vehicle computing system 110 computes monitor pair values for the opened door for each detected mobile device 106 for the opened door based on the first data snapshot 202. Based on the monitor pair values, associates the mobile device 106 closest to the opened door as the initial zone 104 association.

At 308, the vehicle computing system 110 detects a door close event. In an example, the vehicle computing system 110 may receive an indication from the body controller that the opened door of the vehicle 102 has been reclosed.

At operation 310, the vehicle computing system 110 captures a second data snapshot 202. In an example, the vehicle computing system 110 may again request tracked values and mobile device 106 attributes from the wireless sensors 108. The vehicle computing system 110 may receive the information, and compile the information into the second data snapshot 202.

At operation 312, the vehicle computing system 110 confirms whether the second data snapshot 202 agrees with the first data snapshot 202. In an example, the vehicle computing system 110 computes monitor pair values for each detected mobile device 106 for the closed door based on the second data snapshot 202.

At 314, the vehicle computing system 110 determines whether the first data snapshot 202 and the second data snapshot 202 agree. In an example, the vehicle computing system 110 determines whether the mobile device 106 indicated in the first data snapshot 202 as being closest to the opened door continues to be the mobile device 106 that is closest to the door that is now closed. If so, control passes to operation 316. Otherwise, control passes to operation 320.

At operation 316, the vehicle computing system 110 assigns the mobile device 106 to the seating zone 104. Accordingly, the mobile device 106 of the entering user is identified by the vehicle computing device 110 as being located within the seating zone 104 that the user had entered.

At operation 318, the vehicle computing system 110 applies settings of the mobile device 106 to the seating zone 104 of the vehicle 102. In an example, the vehicle computing system 110 may maintain climate control, infotainment, and/or seating settings indexed according to mobile device 106 unique identifier. Based on the identification of the mobile device 106 having entered the seating zone 104, the vehicle computing system 110 may apply the maintained settings indexed to the unique identifier of the mobile device 106 to the seating zone 104. After operation 318, the process 300 ends.

At operation 320, the vehicle computing system 110 removes the seating zone 104 assignment of the mobile device 106. For example, the vehicle computing system 110 may do so in the event that the user located within the seating zone 104 exited the vehicle 102. After operation 320, the process 300 ends.

Computing devices described herein, such as the mobile devices 106 and vehicle computing system 110, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
wireless signal sensors surrounding vehicle doors; and
a processor programmed to
capture, from the sensors, a first data snapshot when one of the doors is opened and a second data snapshot when the one of the door is closed, and
assign a mobile device to a seating zone associated with the one of the doors when the first and second snapshots both indicate the mobile device is closest to the door.

2. The system of claim 1, wherein the first snapshot includes signal strength and attribute information for mobile devices in vicinity of the vehicle when the one of the doors is opened, the second snapshot includes signal strength and attribute information for mobile devices in vicinity of the vehicle when the one of the doors is closed, and the mobile device is identified by a unique identifier included in the attribute information.

3. The system of claim 1, wherein the seating zone is a driver seating zone, and the processor is further programmed to associate the mobile device with the vehicle as being located within the driver seating zone.

4. The system of claim 1, wherein the processor is further programmed to:
capture, from the sensors, a third data snapshot when the one of the doors is again opened and a fourth data snapshot when the one of the door is again closed; and
remove assignment of the mobile device from the seating zone when the third and fourth snapshots both indicate the mobile device is closest to the door.

5. The system of claim 1, wherein the wireless sensors of the vehicle advertise as Bluetooth Low Energy (BLE) peripherals, and the mobile device is programmed to scan for BLE peripherals as a BLE central to identify the wireless sensors.

6. The system of claim 1, wherein the wireless sensors are connected to the vehicle computing system over wired universal serial bus (USB) connections, and the processor is programmed to query the sensors for the first data snapshot and the second data snapshot over the wired USB connections.

7. The system of claim 1, wherein the processor is further programmed to:
receive information including vehicle side and front-to-back ordering of the wireless sensors from the wireless sensors; and
identify monitor pairs of the wireless sensors as adjacent wireless sensors on a same vehicle side according to the information.

8. The system of claim 1, wherein the wireless sensors include a first wireless sensor located on a driver side of the vehicle in front of a first driver-side door, a second wireless sensor located on the driver side of the vehicle between the first driver-side door and a second driver-side, a third wireless sensor located on the driver side of the vehicle behind the second driver-side door, a fourth wireless sensor located on a passenger side of the vehicle in front of a first passenger-side door, a fifth wireless sensor located on the passenger side of the vehicle between the first passenger-side door and a second passenger-side, and a sixth wireless sensor located on the passenger side of the vehicle behind the second passenger-side door.

9. The system of claim 8, wherein the mobile device is further programmed to identify a first monitor pair as the first and second of the wireless sensors, identify a second monitor pair as the second and third of the wireless sensors, identify a third monitor pair as the fourth and fifth of the wireless sensors, and identify a fourth monitor pair as the fifth and a sixth of the wireless sensors.

10. A method comprising:
- capturing, from wireless signal sensors surrounding vehicle doors, a first data snapshot when one of the doors is opened and a second data snapshot when the door is closed;
- assigning a mobile device to a seating zone associated with the door when the first and second snapshots both indicate the mobile device is closest to the door; and
- applying settings associated with the mobile device to the seating zone.

11. The method of claim 10, wherein the first snapshot includes signal strength and attribute information for mobile devices in vicinity of the vehicle when the one of the doors is opened, the second snapshot includes signal strength and attribute information for mobile devices in vicinity of the vehicle when the one of the doors is closed, and further comprising identifying the mobile device by a unique identifier included in the attribute information.

12. The method of claim 10, wherein the seating zone is a driver seating zone, and further comprising associating the mobile device with the vehicle as being located within the driver seating zone.

13. The method of claim 10, further comprising:
- capturing, from the sensors, a third data snapshot when the one of the doors is again opened and a fourth data snapshot when the one of the door is again closed; and
- removing assignment of the mobile device from the seating zone when the third and fourth snapshots both indicate the mobile device is closest to the door.

14. The method of claim 10, further comprising:
- advertising, by the wireless sensors, as Bluetooth Low Energy (BLE) peripherals; and
- scanning, by the mobile device, for BLE peripherals as a BLE central to identify the wireless sensors.

15. The method of claim 10, further comprising:
- capturing the first data snapshot responsive to receipt of an indication from a body controller that the one of the doors is opened; and
- capturing the second data snapshot responsive to receipt of an indication from the body controller that the one of the doors is closed.

16. A non-transitory computer-readable medium embodying instructions that, when executed by a processor of a vehicle in communication with wireless signal sensors surrounding doors of the vehicle, cause the vehicle to:
- capture, from the sensors, a first data snapshot responsive to receipt of an indication from a body controller that one of the doors is opened;
- capture, from the sensors, a second data snapshot responsive to receipt of an indication from the body controller that the one of the doors is closed;
- assign a mobile device to a seating zone associated with the door when the first and second snapshots both indicate the mobile device is closest to the door; and
- apply settings associated with the mobile device to the seating zone.

17. The medium of claim 16, wherein the first snapshot includes signal strength and attribute information for mobile devices in vicinity of the vehicle when the one of the doors is opened, the second snapshot includes signal strength and attribute information for mobile devices in vicinity of the vehicle when the one of the doors is closed, and further comprising instructions that, when executed by the processor, cause the vehicle to identify the mobile device by a unique identifier included in the attribute information.

18. The medium of claim 16, wherein the seating zone is a driver seating zone, and further comprising instructions that, when executed by the processor, cause the vehicle to associate the mobile device with the vehicle as located within the driver seating zone.

19. The medium of claim 16, further comprising instructions that, when executed by the processor, cause the vehicle to:
- capture, from the sensors, a third data snapshot when the one of the doors is again opened and a fourth data snapshot when the one of the door is again closed; and
- remove assignment of the mobile device from the seating zone when the third and fourth snapshots both indicate the mobile device is closest to the door.

* * * * *